Aug. 11, 1970   A. DACYSZYN   3,523,412
HARVESTER PICKUP ATTACHMENT
Filed April 29, 1968   2 Sheets-Sheet 1
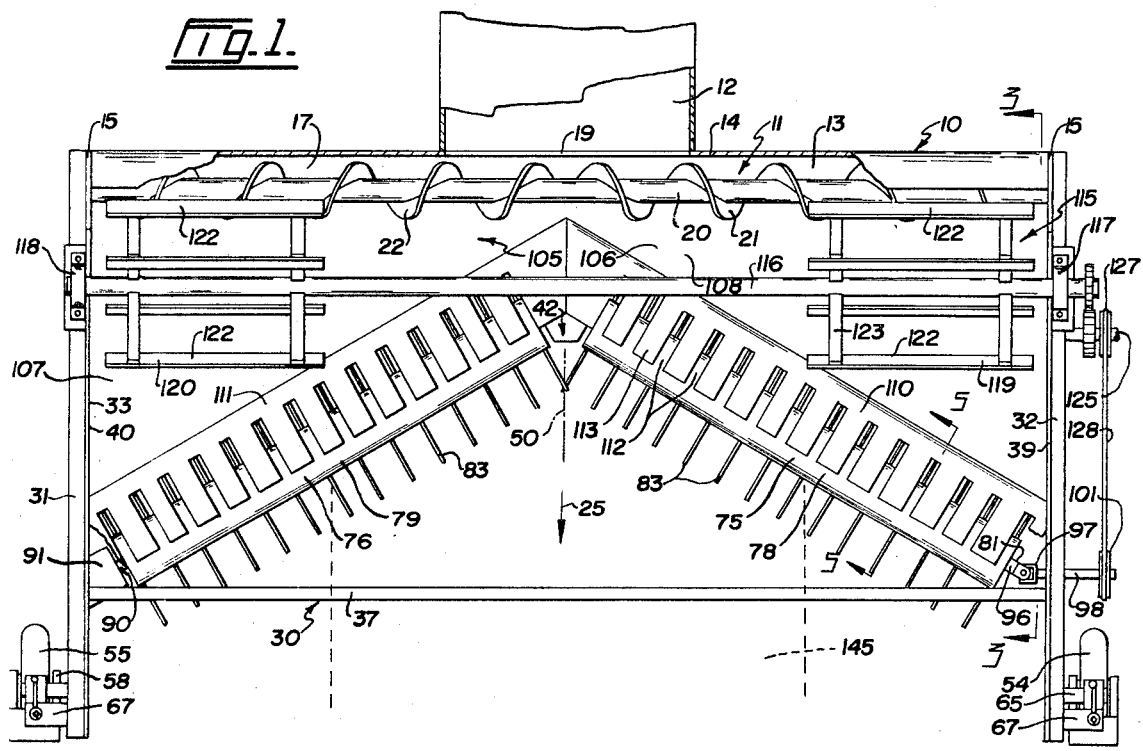
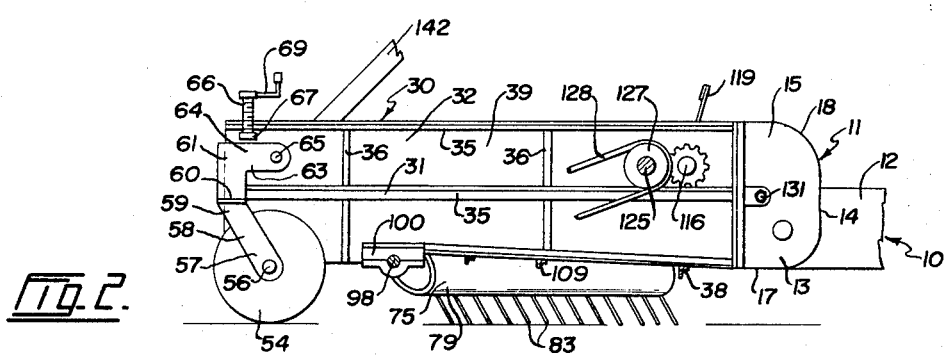
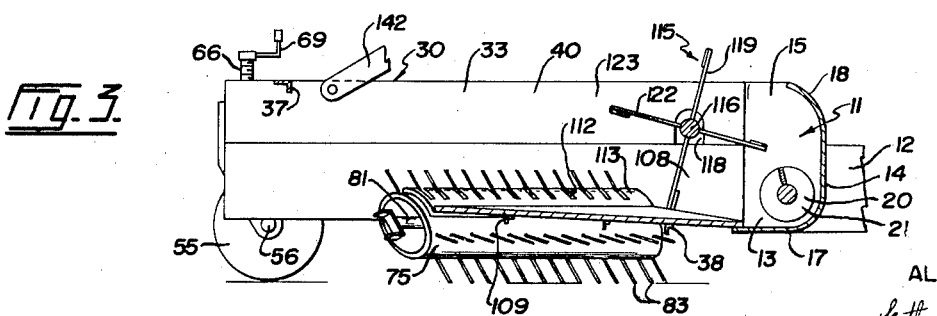
INVENTOR
ALLEN DACYSZYN
BY
Fetherstonhaugh & Co.
ATTORNEYS

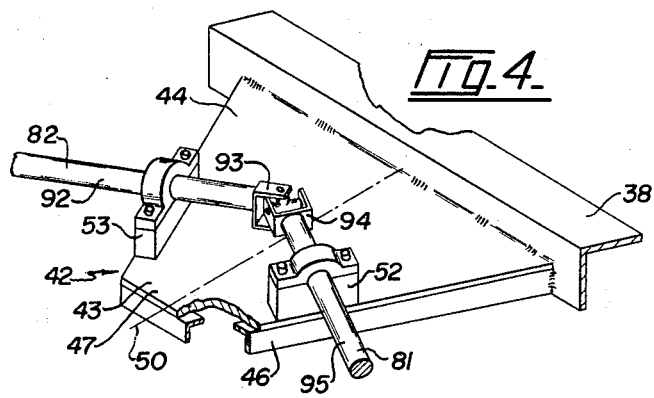
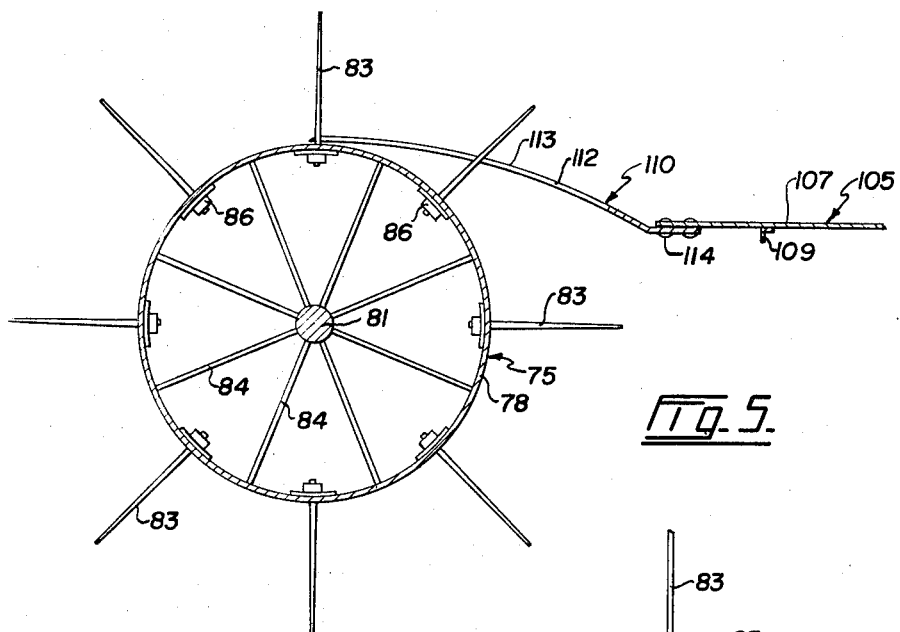
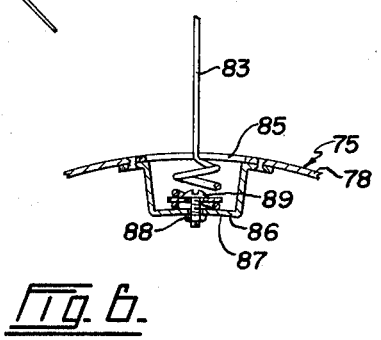

United States Patent Office 3,523,412
Patented Aug. 11, 1970

3,523,412
HARVESTER PICKUP ATTACHMENT
Allen Dacyszyn, P.O. Box 753,
Lethbridge, Alberta, Canada
Filed Apr. 29, 1968, Ser. No. 724,761
Int. Cl. A01d 89/00
U.S. Cl. 56—364        8 Claims

ABSTRACT OF THE DISCLOSURE

A pickup attachment for combine-type harvesters, having a pair of rotary rakes arranged in end-to-end relationship to pick up and deliver the crop on to a table, where it is moved by an impeller into the feed assembly of the combine. The rotational axes of the rakes are angularly disposed to each other in the form of a forwardly opening V whereby the rake tines will strike the swather crop at an angle to the axis of the stalks thereof so as to pick up the latter and spread it laterally as it moves toward the table.

BACKGROUND OF THE INVENTION

This invention relates to crop pickup mechanisms for combine-type harvesters and in particular to pickup mechanisms for gathering grain crops in swath.

In many areas, due to the type of crops grown and climatic conditions, grain crops are cut and simultaneously gathered in swaths or windrows with the grain stalks extending longitudinally of the swath. The swathed crop is then usually left lying on the ground to dry and mature and then picked up and threshed by a harvester. The combine-type harvester is not only employed for threshing crop which has been swathed, but is also employed for certain types of crops and in certain climatic conditions, for cutting and threshing in one operation. They are, therefore, constructed as to have wide feed assemblies so that the width of the cut, when they are used in the cutting and threshing operation, will provide sufficient crop to permit the harvester to be operated efficiently at a relatively low ground speed.

The equipment generally employed in a swathing operation, however, is so constructed that the finished swath is narrower than the entire cut taken.

The conventional pickup attachment for conventional combine-type harvesters is usually provided with an elongated rotary rake which extends transversely of the direction in which the harvester moves, the full width of the feed assembly thereof. The rake tines therefore rotate in planes parallel to the direction of the stalks of the crop and consequently, do not efficiently pick up the latter, thereby necessitating, at times, additional passes over the swathed area. This situation is aggravated in circumstances where rain on the swath has pressed the latter against the ground. Furthermore, as the width of the swath is much less than the full width of the feed assembly of the harvester, heavy crops quite often tend to jam the feed assembly and sometimes spill over.

SUMMARY OF THE INVENTION

The present invention provides a pickup attachment for combine-type harvesters which overcomes the aforementioned problems concerned with pickup attachments of prior design. The pickup attachment of the present invention although using rotary rakes for picking up the swathed crop is so designed that the rake tines do not rotate in planes parallel to the direction in which the stalks of the grain crops extend, but at an angle thereto so as to result in more efficient pickup. Furthermore, due to the angular disposition of the axes of rotation of the rakes, the swathed crop is loosened and spread laterally as it is moved to the feed assembly of the harvester so as to prevent jambing of the latter and consequent spillage and incomplete threshing of the crop when heavy portions of the swath are encountered.

The harvester pickup attachment of the present invention comprises a frame structure, means for mounting the structure forwardly of the feed assembly of a harvester for movement over the ground surface, a table arranged in the frame structure having a leading edge, a pair of axially elongated rotatable rakes mounted on the frame structure ahead of the leading edge of the table for rotation about horizontal and outwardly and forwardly diverging axes, combs mounted on the leading edges of the table for removing the crop picked up by the rakes and depositing the same on the table, and impeller means for moving the crop over the table and into said feed assembly.

BRIEF DESCRIPTION OF THE DRAWINGS

FIG. 1 is a plan view of the invention and a front portion of a conventional combine-type harvester, FIG. 2 is a side elevational view of the invention with portions thereof removed for purposes of clarity, FIG. 3 is a sectional view taken on line 3—3 of FIG. 1, FIG. 4 is an enlarged isometric view of a portion of the invention, FIG. 5 is an enlarged sectional view of a portion of the invention taken along line 5—5 of FIG. 1, and FIG. 6 is an enlarged view of a portion of the invention.

DESCRIPTION OF THE PREFERRED EMBODIMENT

Referring to the drawings, and particular to FIG. 1, there is illustrated a front portion of a combine-type harvester designated by the reference numeral 10. This harvester may be of the self-propelled or towed type having a feed assembly 11 which feeds the crop through a central feed chute 12 into the threshing components, not shown. As the threshing components are well known and as they do not constitute part of this invention, they are neither described or illustrated.

The feed assembly 11 includes a relatively wide, forwardly opening trough 13 having a back wall 14, side walls 15, a bottom wall 17 and upper wall 18, said back wall having a central opening 19 defining the forward end of the feed chute 12.

Extending longitudinally of the trough, adjacent the back wall 14 thereof, is an elongated auger 20, having oppositely wound helical conveyor blades 21 and 22 for directing any crop picked up, inwardly towards the central opening 19 and into the chute 12 from whence it is carried by known means, not shown, into the threshing components, not shown, of the harvester.

Conventional harvesters are designed to enable the crop to be cut and threshed in one operation. In order to do this, the harvester is usually provided with cutters and impellers, not shown, located forwardly of the trough 13 whereby the standing crop may be cut and moved back into the auger as the harvester moves forwardly in the direction as shown by the arrow 25 on FIG. 1. In order, therefore, for the harvester to operate efficiently, the auger 20 and trough 13 are relatively wide so that the amount of crop cut in one pass will be compatible with the capacity of the harvester without requiring excessive ground speeds thereof.

In many parts of the country, however, grain crops are cut and windrowed into swaths in order that the crops may mature properly. Equipment used for cutting and swathing normally makes a cut substantially the same width as the cut taken by a conventional harvester, however, in order to prevent loss of crop due to wind action and the like, this equipment forms a swath of considerably less width than the width of the cut. In areas where heavy crops are to be dealt with, the swaths are therefore very thick. Where swaths of this nature are encountered, the capacity of the feed assembly 11 is sometimes insufficient to feed all of the crop into the feed chute without reducing the ground speed of the harvester.

In the initial cutting and windrowing of the crop, the grain stalks extend parallel to the direction in which they have been cut, thereby causing pickup problems for conventional harvester pickup apparatus.

The pickup apparatus of the present invention, herein accorded the numeral 30, includes a supporting frame 31 having a left side structure 32 and a right side structure 33, both left and right structures being formed of relatively light horizontal 35 and vertical 36 angle members which are suitably interconnected as by welding. These side structures which extend in the fore and aft direction are maintained in rigid spaced apart relationship by means of upper brace members 37 and a lower brace member 38 suitably connected to the angle members forming said left and right side structures. The upper and lower brace members are of heavy angle construction and the lower member 38 is secured at the lower and aftermost corners of said left and right side structures. The width of the supporting frame 31 is less than full width of the trough 13 so as to fit between the side walls 15 of the latter. The left and right side structures 32 and 33 are also provided with side plates 39 and 40 formed of thin sheet iron or the like.

Mounted on and centrally of the lower brace member 38 is a forwardly projecting support 42. This support 42 (reference FIG. 4) is formed of a heavy fore and aft elongated metallic plate 43 connected at its after end 44 as by welding to the lower brace member 38. Structural members, preferably angle irons 46, connected, as by welding, to said member 38 provide vertical support for the plate 43. Mounted on the plate 43 on opposite sides of the centre line 50 of the apparatus are a pair of pillow blocks 52 and 53. These pillow blocks are angularly related to each other and to the fore and aft centre line 50 of said apparatus.

Mounted at the forward ends of each of the left and right side structures 32 and 33 are supporting wheels 54 and 55 (reference FIGS. 1 and 2). These wheels are each mounted for rotation on axles 56 which extend between the lower ends 57 of forwardly projecting yokes 58, the upper ends 59 of the latter having a swivel connection with the lower ends 60 of arms 61 of L-shaped supports 63. The other arm 64 of said supports 63 are rotatably journalled on transversely projecting pivot pins 65 extending from said left and right structures 32 and 33. Angular adjustment of the supports 63 about the pivot pin 65 is attained by means of vertically threaded shafts 66 which threadedly engage threaded brackets 67, the latter being secured as by welding to side plates 39 and 40. The shafts 66 are provided with operating handles 69 at their upper ends. The lower ends of the threaded shafts engage the arms 64 off-centre of the pivot pins 65. This arrangement permits angular positioning of the supports 63 and consequently, permits the lowering or elevating of the forward end of the supporting frame relative to the wheels 54 and 55.

Mounted for rotation between the left and right side structures are a pair of rotary rakes 75 and 76. These rakes are of elongated hollow drums 78 and 79, respectively, nonrotatably mounted on elongated shafts 81 and 82, respectively. Tines 83 which are preferably formed of heavy spring steel wire extend radially from the drums, said tines preferably being arranged in axially spaced apart groups with the innermost group of tines on one rake overlapping, in interdigital relationship the innermost group on the other rake.

The rakes 75 and 76 are identical, one 75 being illustrated in FIGS. 5 and 6. It will be seen that drum 78 is formed of thin sheet steel and is nonrotatably connected in spaced concentric relationship to the shaft 81 by sets of spider rods 84. A set of these spider rods is located at each end of the drum 78. FIGS. 5 and 6 illustrate, in detail, a preferred type of connection of the tines and drums. In each drum a plurality of circumferentially aligned and axially spaced sets of apertures 85 are formed in each of which, is inset and secured, as by riveting, a U-shaped bracket 86 having a centrally apertured base 87 beneath the aperture of which a nut 88 is secured as by welding. Each tine 83 which is wound into a coil form at its butt end is secured to the base of the bracket by a screw and washer unit 89 threadably engaging the nut 88. The tines will, therefore, have a degree of flexibility to permit them to bend when encountering obstructions such as stones and the like.

Shaft 82 of rake 76 is journalled for rotation at its outer end 90 in a suitable pillow block 91 secured to side structure 33 adjacent the forward end of the latter and extends inwardly and rearwardly at its inner end 92 through pillow block 53. Consequently, the axis of the shaft 82 bears an angular relationship to the centre line 50 of the apparatus. The angle between said axis and said centre line 50 may be variable depending upon the type of crop to be threshed but in most cases an angle of 60° has been found to be satisfactory. At its inner end 92 shaft 82 is provided with a yoke 93, see FIG. 4, which is universally coupled to a yoke 94 carried at the inner end 95 of shaft 81. Shaft 81 is rotatably supported by pillow block 52 and is coupled, universally at its outer end 96 to the inner end 97 of a short shaft 98 which, itself, is rotatably supported in bearings 100 mounted on the side structure 32 near the forward end of the latter. The shaft 98 is provided with a V-pulley 101 nonrotatably connected to its outer end. Rake 75 is arranged so that it bears the same angular relationship as rake 76 to the centre line 50 of the apparatus.

Mounted in the frame structure is a table 105 composed of left and right sections 106 and 107. Table section 106 is triangular in shape and is formed of a triangular piece of sheet steel 108 mounted on light angle members 109 which extend between one of the horizontal members 35 and lower brace member 38. Table section 106 is positioned so that its leading edge is substantially above the rotational axis of rake 75 and is clear of the tines 83 thereof. Section 107 of the table 105 is constructed in the same manner as section 106 and is positioned in a manner corresponding to the latter behind the rotary rake 76.

Fixed to the table sections 106 and 107 are combs 110 and 111, respectively (reference FIGS. 1 and 5). These combs are formed of elongated rectangular sections of sheet metal having elongated transversely extending slots 112 opening out of one of their side edges as so as to form broad, elongated teeth 113 and are secured at the other of their side edges as by rivets 114 to the leading edges of their associated table sections. The teeth 113 (reference FIG. 5) extend outwardly upwardly from the leading edges of their associated table sections in interdigital relationship with the groups of tines on the rakes which they confront and slidably bear against the drums thereof.

Mounted behind the combs 110 and 111 over the table 105 is an impeller assembly 115. This impeller assembly includes an elongated shaft 116 which is mounted for rotation in bearings 117 and 118 which are mounted on the right and left side structures 32 and 33, respectively. Impellers 119 and 120 are mounted on the shaft 116 for rotation therewith. These impellers are a conventional type, well known in the industry, and take the form of elongated blades 122 mounted on the ends of spider rods 123, radiating from shaft 116, said blades 122 extending parallel with shaft 116.

Shaft 116 is in gear driven engagement with a jack shaft 125 which is rotatably mounted in a supporting bracket connected to the left side structure 32. This jack shaft also has a driving connection with pulley 101 via a V-pulley 127 and belt 128 and has a driven connection with the power take-off unit, not shown, of the harvester. The jack shaft when in driven engagement with the power take-off unit is rotated in a direction which will result in rotation of the combs in a direction in which they will sweep forwardly over the ground when the pickup apparatus is moved in the direction of the arrow 25 and which will result in rotation of the impellers in the opposite direction.

It will be appreciated that the harvester 10 may be one of many makes. The means of connection of the apparatus 30 with the harvester will therefore vary in accordance with the structural characteristics of the harvester.

In certain instances, the connection may be made by connecting the right and left side structures with the side wall 15 of the trough 13 as by bolts 131 so as to provide for pivotal movement of the pickup apparatus 30 relative to the harvester. In other instances, connection may be made by way of elongated braces 142 which extend between said side structures 32 and 33 and suitable structural elements, not shown, on the harvester. Although the connection of the apparatus of the harvester should, preferably, be of a pivotal type it may also be rigid where ground conditions permit.

In operation, the height of the apparaus above ground is adjusted so that the tines 83 of the rakes, when rotated, will just scrape the ground surface. The harvester is moved longitudinally of, and centered over, the swath, herein accorded numeral 145, at a speed slower than the peripheral speed of the rakes and impellers 119 and 120. As the apparatus moves in the direction of the arrow 25 the tines pick up the crop in swath and lift it upwardly over the combs and onto the table sections, whence it passes rearwardly into the trough where it is moved inwardly by the auger to the feed chute. It will be observed that due to the angular aspect of the rakes relative to the direction of travel of the apparatus, the tines will strike the grain stalks at an angle rather than longitudinally thereof as is the case with most equipment of this nature. This angular aspect together with the overlapping of the innermost groups of tines on the rakes will ensure a complete pickup in one pass. Furthermore, the angular aspect insures that as the crop is picked up it is loosened so that it will not enter the threshing components of the harvester in a compact mass, thereby ensuring substantially complete threshing.

The impellers will engage any crop which may be directed towards the outside of the tables and will move it into the trough to be picked up by the auger.

I claim:

1. Pickup apparatus for a combine-type harvester having a front feed assembly comprising a frame structure adapted to be connected to the harvester forwardly of the feed assembly thereof for movement over the ground surface, a table mounted on the frame structure forwardly of the feed assembly, a pair of axially elongated rotary rakes mounted in the structure ahead of the table for picking up a crop in swath and depositing the same on the table, said rakes diverging outwardly and forwardly so as to spread the crop laterally as the latter is moved on to the table, and impeller means mounted over the table for moving the crop into the feed assembly of the harvester.

2. Pickup apparatus for a combine-type harvester having a front mounted feed assembly comprising a frame structure adapted to be connected to the harvester forwardly of the feed assembly thereof for movement over the ground surface, a table mounted on the structure forwardly of said feed assembly, a pair of axially elongated rotary rakes having radially extending tines mounted on the structure ahead of the table, said rakes diverging outwardly and forwardly and being rotated in a direction in which the tines thereof move forwardly over the ground surface so as to pick up the crop and spread it laterally, combs mounted on the table, said combs having teeth extending in interdigital relationship with the tines for removing the crop from the latter and depositing the same on the table, and impeller means mounted over the table for moving the crop into the feed assembly of the harvester.

3. Pickup apparatus as claimed in claim 2 in which the rakes are universally interconnected at inner ends thereof for mutual rotation.

4. Pickup apparatus as claimed in claim 2 in which the tines are arranged in axially spaced apart groups, said groups being positioned so that the tines of the innermost group on one rake overlap the tines of the innermost group of the other rake.

5. Pickup apparatus for a combine-type harvester having a front mounted feed assembly comprising a frame structure adapted to be connected to the harvester forwardly of feed assembly thereof, said frame structure having ground engaging wheels at the forward end for movement over the ground surface, a table mounted in the structure ahead of the feed assembly, said table having a forward leading edge, a pair of axially elongated horizontally extending rotary rakes mounted in the structure ahead of the table having their rotational axes aligned with the leading edge of the latter, said rotary rakes diverging outwardly and forwardly and are rotated in a direction in which they sweep forwardly over the ground so as to lift a crop upwardly and at the same time spread the latter laterally as it is moved towards the table, combs having teeth extending from the leading edge of the table for removing the crop from the rakes, said combs extending forwardly and upwardly so as to direct the crop on to the table, and impeller means mounted over the table for moving the crop into the feed assembly of the harvester.

6. Pickup apparatus as claimed in claim 5 wherein each rake comprises an elongated drive shaft, an elongated drum concentric to the drive shaft and connected thereto for mutual rotation therewith and flexible tines radiating from the drum, and wherein said comb teeth are arranged in interdigital relationship with the tines and slidably engage the drum at their free ends.

7. Pickup apparatus as claimed in claim 5 in which the rakes are universally interconnected at inner ends thereof for mutual rotation.

8. Pickup apparatus as claimed in claim 5 in which the tines are arranged in axially spaced apart groups, said groups being positioned so that the tines of the innermost group on one rake overlap the tines of the innermost group of the other rake.

References Cited

UNITED STATES PATENTS

| 1,096,043 | 5/1914 | Lomen | 56—377 X |
| 1,336,065 | 4/1920 | Bowers | 56—344 |
| 2,682,743 | 7/1954 | Hintz | 56—364 |
| 3,125,845 | 3/1964 | Lee | 56—364 |

ANTONIO F. GUIDA, Primary Examiner